United States Patent
Kishimoto et al.

(10) Patent No.: US 11,393,012 B2
(45) Date of Patent: Jul. 19, 2022

(54) ARTICLE INPUT DEVICE AND ARTICLE INPUT SYSTEM

(71) Applicant: TOSHIBA TEC KABUSHIKI KAISHA, Tokyo (JP)

(72) Inventors: Seiya Kishimoto, Shinagawa Tokyo (JP); Sadatoshi Oishi, Fuji Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 281 days.

(21) Appl. No.: 16/748,129

(22) Filed: Jan. 21, 2020

(65) Prior Publication Data

US 2020/0302509 A1 Sep. 24, 2020

(30) Foreign Application Priority Data

Mar. 22, 2019 (JP) .............................. JP2019-055097

(51) Int. Cl.
  *G06Q 30/06* (2012.01)
  *G06K 7/10* (2006.01)
(52) U.S. Cl.
  CPC ..... *G06Q 30/0633* (2013.01); *G06K 7/10297* (2013.01)
(58) Field of Classification Search
  CPC .............................................. G06Q 30/06–08
  See application file for complete search history.

(56) References Cited

U.S. PATENT DOCUMENTS

| | | | |
|---|---|---|---|
| 2002/0170961 A1 | 11/2002 | Dickson et al. | |
| 2004/0073489 A1* | 4/2004 | Varatharajah | B62B 3/1424 705/23 |
| 2007/0008068 A1* | 1/2007 | Brice | B62B 3/1424 340/5.91 |
| 2008/0149710 A1* | 6/2008 | Silverbrook | G06Q 10/00 235/383 |
| 2014/0001258 A1* | 1/2014 | Chan | G06Q 10/0875 235/385 |
| 2017/0186072 A1* | 6/2017 | Clark | G06Q 30/0633 |
| 2019/0057432 A1 | 2/2019 | Sekine et al. | |

FOREIGN PATENT DOCUMENTS

| | | |
|---|---|---|
| EP | 2778713 A1 | 9/2014 |
| EP | 3373260 A1 | 9/2018 |
| JP | 2007-034789 A | 2/2007 |

OTHER PUBLICATIONS

From touch displays to the Surface: (Year: 2013).*
Touchscreens: Past, Present, and Future (Year: 2018).*
Extended European Search Report dated Aug. 10, 2020 in corresponding European Patent Application No. 20159028.8, 7 pages.

* cited by examiner

*Primary Examiner* — Ming Shui
(74) *Attorney, Agent, or Firm* — Kim & Stewart LLP (57) ABSTRACT

An article input device includes a processor. The processor acquires identification information read from a wireless tag by a reading unit installed in a first carrier carrying an article. The processor registers the acquired identification information in a first list when the acquired identification information is not registered in a second list in which identification information read from a wireless tag by a second reading unit installed in a second carrier carrying an article is registered. The processor causes a display on the first carrier to output a notification when the acquired identification information is registered in the second list.

8 Claims, 7 Drawing Sheets

ARTICLE INPUT DEVICE AND ARTICLE INPUT SYSTEM

CROSS-REFERENCE TO RELATED APPLICATION

This application is based upon and claims the benefit of priority from Japanese Patent Application No. 2019-055097, filed on Mar. 22, 2019, the entire contents of which are incorporated herein by reference.

FIELD

Embodiments described herein relate generally to an article input device and an article input system.

BACKGROUND

Rolling carriages, such as shopping carts or stock picking carts, are used to transport items such as consumer products and retail merchandise. An apparatus to which a tag reading device for reading information from a wireless tag such as a radio frequency identifier (RFID) tag attached to each item has been proposed. Such a device when installed on the carriage can be used to register/identify items being placed in a cart by reading wireless tags attached to the items.

However, when one carriage passes near another, for example in a grocery store aisle or the like, the tag reader of one carriage may inadvertently read a wireless tag on item in the other carriage. This may cause erroneous registration of items.

DETAILED DESCRIPTION

In general, according to one embodiment, an article input device of the embodiment includes a processing unit. The processor acquires identification information read from a wireless tag by a reading unit installed in a first carrier carrying an article. The processor registers the acquired identification information on a first list when the acquired identification information is not registered on a second list in which identification information read by a second reading unit on a second carrier carrying an article has been registered. The processor causes a display on the first carrier to output a notification when the acquired identification information is registered on the second list.

Hereinafter, an input system according to embodiments will be described with reference to the drawings. In addition, each drawing used for description of the following embodiments may change the scale of each part suitably. Further, for the sake of explanation and for the sake of clarity, some elements may be omitted in each drawing used in the description of the following embodiments. Moreover, in each drawing and the following description, the same reference numeral and letter refers to the same element.

First Embodiment

Figure 1:
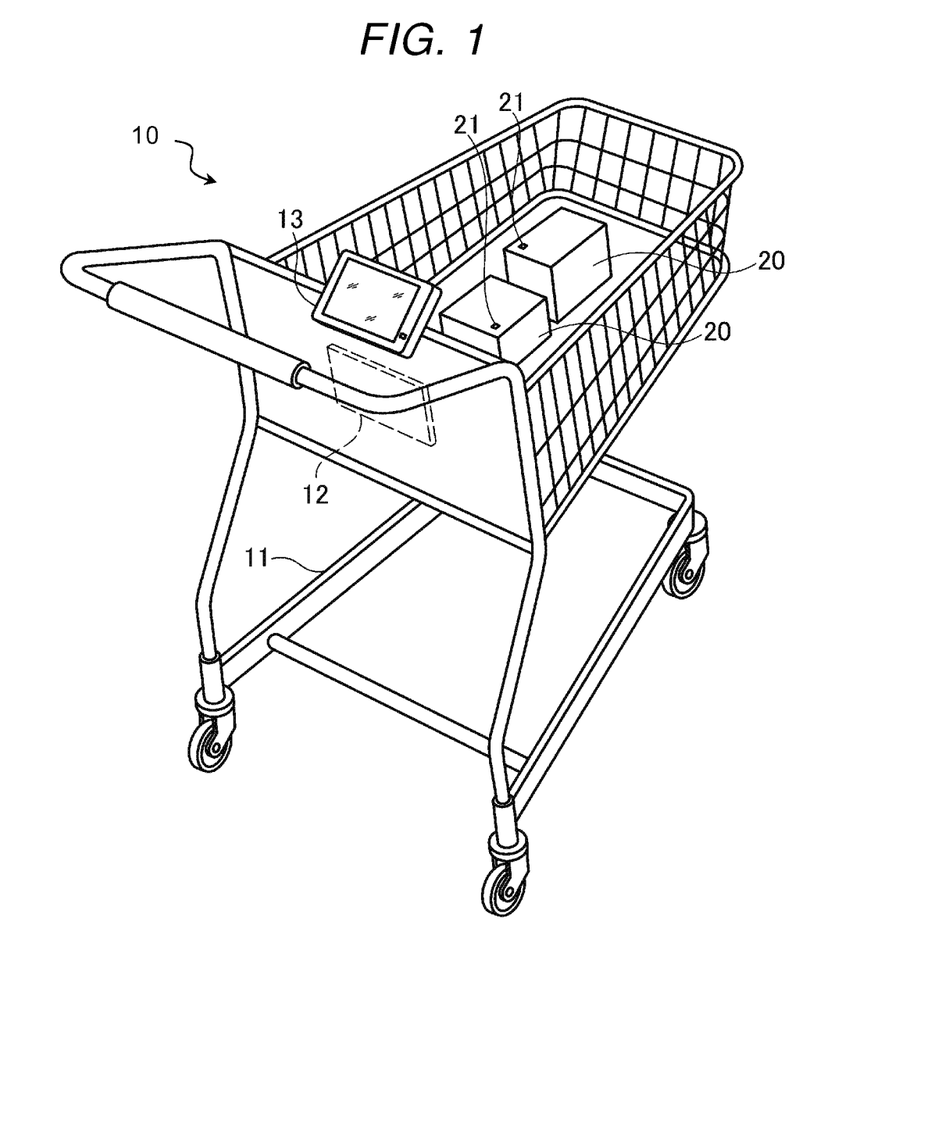
FIG. 1 is a view illustrating aspects of an input system according to a first embodiment.

FIG. 1 is a view illustrating an aspects of an input system according to a first embodiment.

The input system 1 (see FIG. 2) is on a plurality of carts 10. FIG. 1 illustrates a cart 10. The cart 10 is, for example, a shopping cart or a trolley. The cart 10 can be used to carry an article 20 or articles 20. In this example, the cart 10 includes a cart body 11, an antenna 12, and a terminal device 13. The cart 10 is an example of a carrier that carries the article(s) 20. The input system 1 is an example of an article input system.

The cart body 11 functions, for example, as a shopping cart or a stock picking cart. The cart body 11 includes wheels and the like for facilitating movement. In addition, the cart body 11 can receive an article 20 or, more particularly, in this example, the cart body 11 includes a basket in which the article 20 can be placed.

An article 20 is a retail product, for example. Each article 20 has a wireless tag 21 attached thereto. The wireless tag 21 is, for example, an RFID tag. The wireless tag 21 is typically a passive tag, but may be a semi-active tag or an active tag. The wireless tag 21 includes a memory for storing information and the like. The memory stores, for example, information about the article 20 such as an article ID (identifier) and an article name. The article ID is unique identification information given to each article 20. The article ID stored in the wireless tag 21 is an article ID given to the particular article 20 to which the wireless tag 21 is attached. The article name is a standard name for the article 20 or the like. The article name is, for example, a product name or category.

The antenna 12 is used to communicate with a wireless tag 21 attached to an article 20 placed in the cart body 11. That is, the antenna 12 transmits a radio wave to the wireless tag 21 attached to the article 20. The antenna 12 receives a radio wave transmitted from the wireless tag 21.

Figure 2:
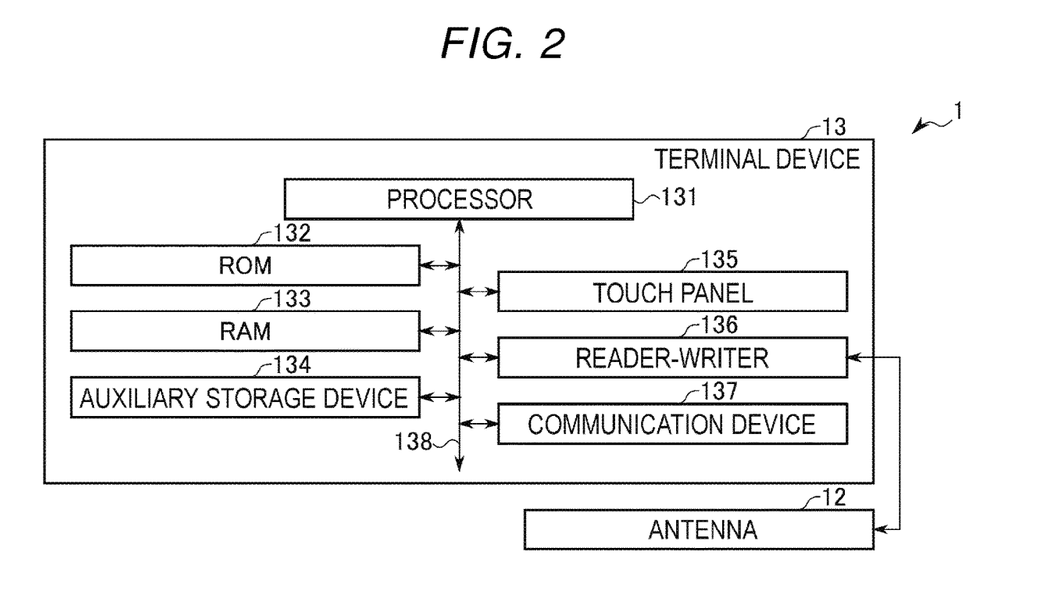
FIG. 2 is a block diagram illustrating an example of a circuit configuration of a terminal device.

The terminal device 13 is an electronic device used for registering articles. FIG. 2 is a block diagram illustrating an example of a circuit configuration of the terminal device 13. As an example, the terminal device 13 includes a processor 131, a read-only memory (ROM) 132, a random-access memory (RAM) 133, an auxiliary storage device 134, a touch panel 135, a reader-writer 136, and a communication device 137. A bus 138 or the like connects those units. The terminal device 13 of the first embodiment is an example of an article input device.

The processor 131 corresponds to a central part of a computer that performs processing such as calculation and control necessary for the operation of the terminal device 13. The processor 131 controls each unit to realize various functions of the terminal device 13 based on programs such as firmware, system software, and application software stored in the ROM 132, the auxiliary storage device 134, or the like. Part or all of the program may be incorporated in a circuit of the processor 131. The processor 131 is, for example, a central processing unit (CPU), a micro processing unit (MPU), a system on a chip (SoC), a digital signal processor (DSP), a graphics processing unit (GPU), an application specific integrated circuit (ASIC), a programmable logic device (PLD), or a field-programmable gate array (FPGA). Alternatively, the processor 131 is a combination of two or more of CPU, MPU, SoC, DSP, GPU, ASIC, PLD, and FPGA. The processor 131 is an example of a processing unit.

The ROM 132 corresponds to a main storage device of a computer having the processor 131 as a central part. The ROM 132 is a non-volatile memory used exclusively for reading data. The ROM 132 stores, for example, firmware among the above programs. The ROM 132 stores data, various setting values, and the likes used by the processor 131 for performing various processes.

The RAM 133 corresponds to a main storage device of a computer having the processor 131 as a central part. The RAM 133 is a memory used for reading and writing data. The RAM 133 is used as a so-called work area that stores data temporarily used when the processor 131 performs various processes. The RAM 133 is a volatile memory, for example.

The auxiliary storage device 134 corresponds to an auxiliary storage device of a computer having the processor 131 as a central part. The auxiliary storage device 134 is, for example, an electrically erasable programmable read-only memory (EEOROM), a hard disk drive (HDD), a solid state drive (SSD), or an embedded multimedia Card (eMMC). The auxiliary storage device 134 stores, for example, system software and application software among the above programs. The auxiliary storage device 134 stores data used when the processor 131 performs various processes, data generated by the process in the processor 131, various setting values, and the likes.

The auxiliary storage device 134 also stores a registration list for registering article IDs. Further, the auxiliary storage device 134 stores a threshold value T1. The threshold value T1 will be described below.

The programs stored in the ROM 132 or the auxiliary storage device 134 include a program for executing processing to be described below. As an example, the terminal device 13 is transferred to an administrator of the terminal device 13 or the like with the program already stored in the ROM 132 or the auxiliary storage device 134. However, the terminal device 13 may also be transferred to the administrator or the like without the program pre-stored in the ROM 132 or the auxiliary storage device 134. The terminal device 13 may be transferred to the administrator or the like with another or different program stored in the ROM 132 or the auxiliary storage device 134. In such cases, a program for executing processing described below may be separately transferred to the administrator or the like and then written to the ROM 132 or the auxiliary storage device 134 under the control of the administrator or a service technician. Transfer of the program in such cases can be realized by recording the program on a removable storage medium, such as a magnetic disk, a magneto-optical disk, an optical disk, or a semiconductor memory or by downloading the program via a network or the like.

The touch panel 135 is formed by stacking a display such as a liquid crystal display or an organic EL display and a touch input pointing device, for example. The display included in the touch panel 135 functions as a display device that displays a screen for notifying an operator of the cart 10 of various pieces of information. The touch panel 135 functions as an input device that accepts a touch operation by the operator. The touch panel 135 is an example of a notification unit.

The reader-writer 136 demodulates the radio wave transmitted from the wireless tag 21 and received by the antenna 12. As a result, the reader-writer 136 reads information recorded in the wireless tag 21 in cooperation with the antenna 12. In addition, the reader-writer 136 can modulate the radio wave to transmit information to the wireless tag 21. The reader-writer 136 can write information to the wireless tag 21 in cooperation with the antenna 12. As described above, the reader-writer 136 has a function as a reader that reads information recorded in the wireless tag 21 and a function as a writer that writes information in the wireless tag 21. In some examples, the terminal device 13 may include a device which does not function as a writer but only functions as a reader, instead of the reader-writer 136.

The communication device 137 is a device for communicating between the carts 10. That is, the communication device 137 is a device for communicating between the terminal devices 13. The terminal device 13 communicates with another terminal device 13 via the communication device 137. The communication devices 137 directly communicate with each other using, for example, short-range wireless communication such as Bluetooth™.

The bus 138 includes a control bus, an address bus, a data bus, and the like and transmits signals exchanged in each part of the terminal device 13.

Figure 3:
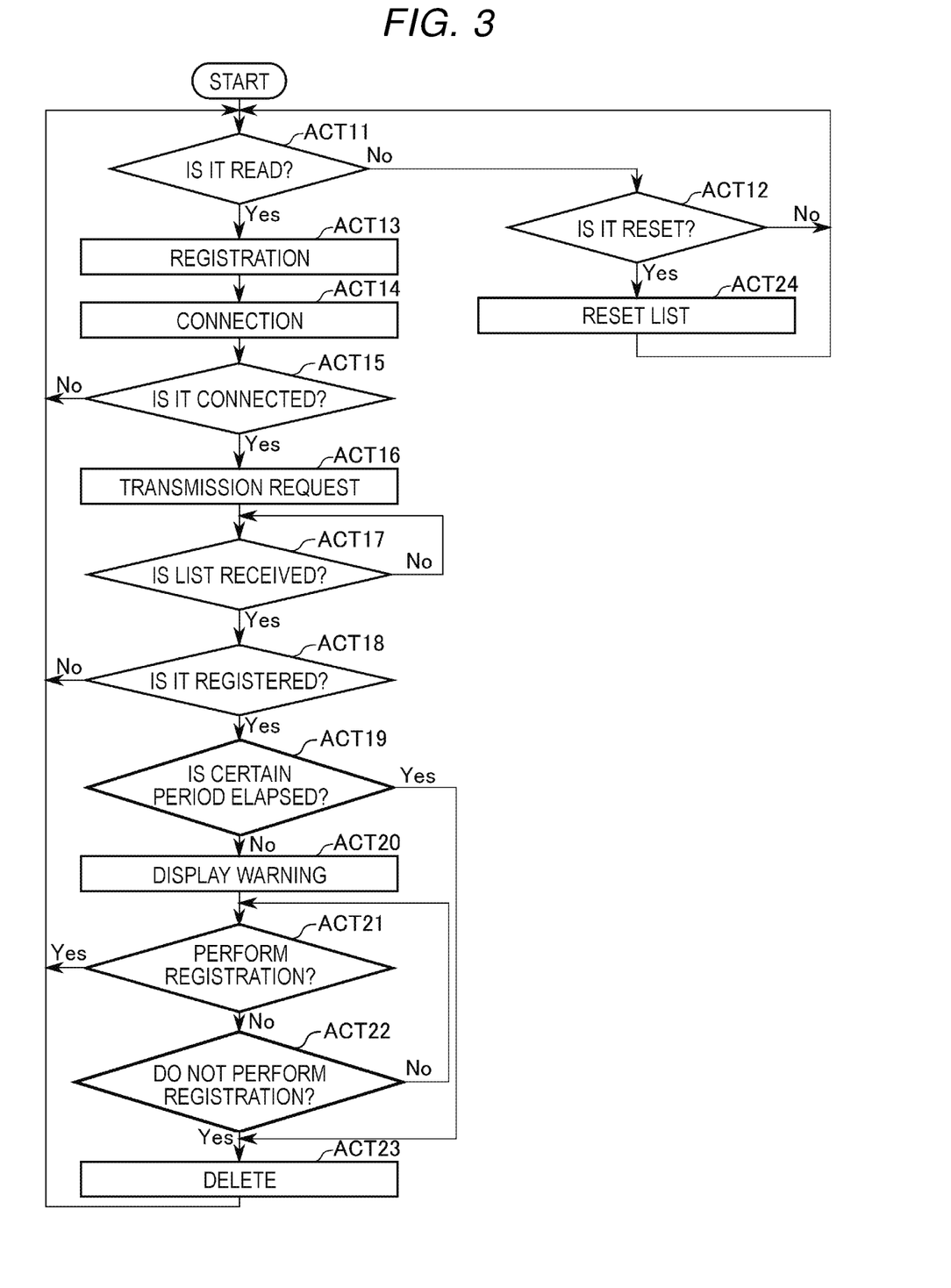
FIG. 3 is a flowchart illustrating an example of processing according to the first embodiment.
Figure 4:
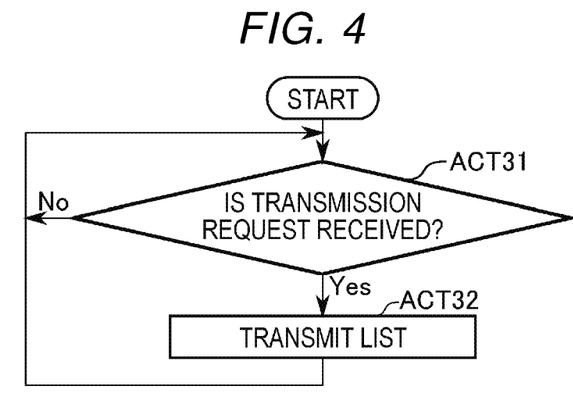
FIG. 4 is a flowchart illustrating an example of processing.

Hereinafter, an operation of the input system 1 according to the first embodiment will be described with reference to FIGS. 3 and 4. The content of the processing in the following description of the operation is an example and various processing that can obtain the similar result can be used as appropriate. FIGS. 3 and 4 are flowcharts illustrating an example of processing by the processor 131 of the terminal device 13. The processor 131 executes the processing based on a program stored in the ROM 132 or the auxiliary storage device 134, for example. When the processor 131 proceeds to ACT (n+1) after processing of ACT n (n is a positive integer), a description of this flow of steps may be omitted.

In the following description of the operation, description will be given focusing on one of a plurality of carts 10. The one cart 10 is referred to in this context as cart 10A. Also, a cart 10 other than cart 10A will be called cart 10B. In the following description, a suffix of "A" or "B" may be added to the end of the reference numerals of the various components included in a cart 10 to indicate which cart 10 is being referenced. That is, the components with a "A" suffix on reference numerals are components of the cart 10A and the components with a "B" suffix on the reference numerals are components of the cart 10B. For a component with neither A nor B added to the end of the reference numerals does not intended to specify whether it is a component of the cart 10A or the cart 10B, but describes the carts 10 in general.

The cart 10A is an example of a first carrier. The cart 10B is an example of a second carrier. An antenna 12A and a reader-writer 136A together operate as an example of a first reading unit. An antenna 12B and a reader-writer 136B together operate as an example of a second reading unit. The registration list stored in an auxiliary storage device 134A is an example of a first list. The registration list stored in an auxiliary storage device 134B is an example of a second list.

A user of the cart 10A places an article 20 on a cart body 11A. For example, when the user of the cart 10A is a customer of a retail store, the article 20 is placed on the cart body 11A as part of the purchasing process. Alternatively, when the user of the cart 10A is a person in charge of selecting items or the like, the article 20 placed on the cart body 11A as part of a stock picking process or the like. When, or as, the article 20 is placed on the cart body 11A, the antenna 12A and the reader-writer 136A read an article ID, an article name, and the like from the wireless tag 21 attached to the article 20.

When the cart 10A and the cart 10B are close to each other, the antenna 12A and the reader-writer 136A may inadvertently read the article ID, the article name, and the like from the wireless tag 21 attached to an article 20 placed on the cart 10B.

In ACT 11 of FIG. 3, a processor 131A determines whether the article ID, the article name, and the like have been read from the wireless tag by the antenna 12A and the reader-writer 136A. The article ID read in this case is hereinafter referred to as the "read article ID". When the article ID and the article name are not read from a wireless tag, the processor 131A determines No in ACT 11 and proceeds to ACT 12. Here, the read article ID is acquired by the processor 131A.

In ACT 12, the processor 131A determines whether or not to reset the registration list. When the registration list is not reset, the processor 131A determines No in ACT 12 and returns to ACT 11. Thus, the processor 131A repeats ACT 11 and ACT 12 until it is determined that the article ID is read from the wireless tag by the antenna 12A and the reader-writer 136A or the registration list is reset.

When the article ID is read from the wireless tag by the antenna 12A and the reader-writer 136A when the processor 131A is in the standby state of ACT 11 and ACT 12, the processor 131A determines Yes in ACT 11 and proceeds to ACT 13.

In ACT 13, the processor 131A writes the read article ID in the registration list stored in the auxiliary storage device 134A in association with the current time. Thereby, the article ID is registered in the registration list.

In ACT 14, the processor 131A attempts to make a communication connection with a terminal device 13B installed in a cart 10B by using the communication device 137A. The communication device 137A is connected to, for example, all of the communication devices 137B within some predetermined range. The terminal device 13A connects to each of the terminal devices 13B within the predetermined range. The predetermined range is, for example, a maximum communicable range for the communication devices 137. Alternatively, the predetermined range is a range where a communication signal strength or the like is at or above a certain level In ACT 15, the processor 131A determines whether one or more terminal devices 13B are connected by the process of ACT 13. When no terminal device 13B is connected by the process of ACT 13, the processor 131A determines No in ACT 15 and returns to ACT 11. On the other hand, when one or more terminal devices 13B is connected by the process of ACT 13, the processor 131A determines Yes in ACT 15 and proceeds to ACT 16.

In ACT 16, the processor 131A instructs the communication device 137A to transmit a transmission request to all of the terminal devices 13B connected to the terminal device 13A. The transmission request is a signal or communication to the terminal device(s) 13B requesting transmission of the registration list stored in auxiliary storage device 134B. When instructed, the communication device 137A transmits the transmission request to all of the terminal devices 13B connected to the terminal device 13A. The transmitted transmission request is subsequently received by the communication device 137B of each of the terminal device 13B connected the terminal device 13A.

In ACT 31 of FIG. 4, the processor 131B of the terminal device 13B waits for the transmission request to be received by the communication device 137B. When the transmission request is received, the processor 131B determines Yes in ACT 31 and proceeds to ACT 32.

In ACT 32, the processor 131B instructs the communication device 137B to transmit the registration list stored in the auxiliary storage device 134B to the terminal device 13A. When instructed, the communication device 137B transmits the registration list to the terminal device 13A. The transmitted registration list is received by the communication device 137A of the terminal device 13A. The processor 131B returns to ACT 31 after processing of ACT 32.

As described above, the registration list is transmitted to the terminal device 13A from each of the terminal devices 13B connected to the terminal device 13A.

In ACT 17, the processor 131A waits for the communication device 137A to receive the entire registration list transmitted from the terminal device 13B connected to the terminal device 13A. When the entire registration list transmitted from the terminal device 13B connected to the terminal device 13A is received, the processor 131A determines Yes in ACT 17 and proceeds to ACT 18. As described above, the processor 131A acquires the registration list from the terminal device 13B.

In ACT 18, the processor 131A determines whether the same article ID as the read article ID is registered in any of the registration lists received in ACT 17. When the same article ID as the read article ID is not registered in any of the registration lists received in ACT 17, the processor 131A determines No in ACT 18 and returns to ACT 11. On the other hand, when the same article ID as the read article ID is registered in any of the registration lists received in ACT 17, the processor 131A determines Yes in ACT 18 and proceeds to ACT 19.

In ACT 19, the processor 131A determines whether a certain period of time or more has elapsed since the same article ID as the read article ID was registered in the registration list. That is, the processor 131A obtains an elapsed period obtained by subtracting the time associated with the article ID in the registration list from the current time. Then, the processor 131A determines whether the elapsed period is equal to or greater than the threshold value T1. The threshold value T1 is preset by, for example, an administrator of the terminal device 13 or a service person. Alternatively, the threshold value T1 may be a default value determined by a designer or manufacturer of the terminal device 13 or the like. When the elapsed period is equal to or greater than the threshold value T1, the processor 131A determines that a certain period or more elapsed since the article ID was registered in the registration list. When the article ID is registered in a plurality of registration lists, for example, the processor 131A may have an elapsed period equal to or greater than the threshold value T1 for any one of the registration lists. When the elapsed period is less than the threshold value T1, the processor 131A determines No in ACT 19 and proceeds to ACT 20.

Figure 5:
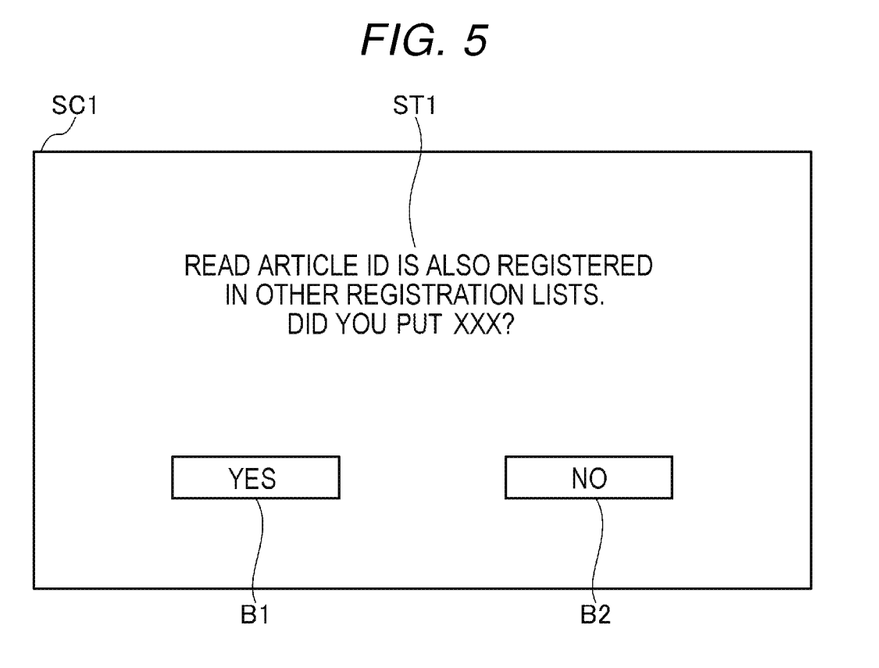
FIG. 5 is a view illustrating an example of a warning screen displayed on a touch panel.

In ACT 20, the processor 131A generates an image corresponding to a warning screen SC1 as illustrated in FIG. 5. Then, the processor 131A instructs the touch panel 135A to display the generated image. In response to this instruction, the touch panel 135A displays the warning screen SC1.

FIG. 5 is a view illustrating an example of the warning screen SC1. The warning screen SC1 is a screen for notifying the user of the cart 10 and the like. The warning screen SC1 includes a character string ST1, a first button B1, and a second button B2.

The character string ST1 includes a character string indicating that the same article ID as the read article ID is already registered in the registration list of terminal device 13B. The character string ST1 includes a character string asking whether the article 20 has been put into the cart body 11. As an example, the character string ST1 is "The read article ID is also registered in other registration lists. Did you put XXX?". Here, "XXX" is an article name read in ACT 11.

The first button B1 is a button operated by the user of the cart 10 when "XXX" is placed on the cart body 11. The first button B1 is a button for instructing to register the read article ID in the registration list.

The second button B2 is a button operated by the user of the cart 10 when "XXX" has not been placed on the cart body 11. The second button B2 is a button for instructing not to register the recently read article ID in the registration list.

In ACT 21, the processor 131A determines whether an operation for instructing to register the read article ID in the registration list was performed. That is, the processor 131A determines whether a predetermined operation such as operating the first button B1 is performed. When an operation for instructing to register the read article ID in the registration list is not performed, the processor 131A determines No in ACT 21 and proceeds to ACT 22.

In ACT 22, the processor 131A determines whether an operation for instructing not to register the read article ID in the registration list was performed. That is, the processor 131A determines whether a predetermined operation such as operating the second button B2 is performed. When the operation of instructing not to register the read article ID in the registration list is not performed, the processor 131A determines No in ACT 22 and returns to ACT 21. Thus, the processor 131A repeats ACT 21 and ACT 22 until an operation for instructing to register the read article ID in the registration list is performed or an operation for instructing not to register the read article ID in the registration list is performed.

When an operation for instructing to register the read article ID in the registration list is performed in the standby state of ACT 21 and ACT 22, the processor 131A determines Yes in ACT 21 and proceeds to ACT 23.

When an operation to instruct not to register the read article ID in the registration list in the standby state of ACT 21 and ACT 22 is performed, the processor 131A determines Yes in ACT 22 and proceeds to ACT 23. When the elapsed time is equal to or greater than the threshold value, the processor 131A determines Yes in ACT 19 and proceeds to ACT 23.

In ACT 23, the processor 131A deletes the read article ID that was written in the registration list in ACT 13 from the registration list. As a result, the read article ID is not registered in the registration list. The processor 131A returns to ACT 11 after the processing of ACT 23.

When the processor 131 determines that the registration list is to be reset when it is in the standby state of ACT 11 and ACT 12, the processor 131 determines Yes in ACT 12 and proceeds to ACT 24. The processor 131 determines to reset the registration list in response to, for example, an operation for instructing to reset the registration list. Alternatively, the processor 131 determines to reset the registration list in response to transmitting the registration list to a point of sale (POS) system or the like for sales transaction accounting (settlement processing) of the article(s) 20 registered in the registration list.

In ACT 24, the processor 131A resets the registration list stored in the auxiliary storage device 134A. That is, the processor 131A deletes all article IDs from the registration list so that no articles ID are included in the registration list. The processor 131A returns to ACT 11 after processing of ACT 24.

According to the input system 1 of the first embodiment, the terminal device 13 reads the article ID from the wireless tag 21 using the antenna 12 and the reader-writer 136. When the read article ID is not already registered in any other nearby terminal device 13, the terminal device 13 registers the read article ID in the registration list. On the other hand, when the read article ID is already registered in another nearby terminal device 13, the terminal device 13 causes the touch panel 135 to display the warning screen SC1. Therefore, the terminal device 13A can prevent an article ID inadvertently read by the antenna 12A and the reader-writer 136A due to the proximity of another cart 10B from being incorrectly registered in the registration list of the terminal device 13A of the cart 10A.

According to the input system 1 of the first embodiment, the terminal device 13 reads the article ID from the wireless tag 21 using the antenna 12 and the reader-writer 136. When the read article ID is not already registered in another terminal device 13, the terminal device 13 registers the read article ID in the registration list. On the other hand, the terminal device 13 does not register the just read article ID in the registration list if the just read article ID is already registered in another, nearby terminal device 13. Thereby, the terminal device 13A can prevent the article ID read using the antenna 12A and the reader-writer 136A from being registered in the registration list of the terminal device 13A when the article being read was actually in or being placed in another cart 10 (a cart 10B) rather than cart 10A.

According to the input system 1 of the first embodiment, when the read article ID is registered by another nearby terminal device 13, the present terminal device 13 does not register the read article ID in the registration list if the time registered for the article ID in the other terminal device 13 is less than a certain time. Thereby, the terminal device 13A can prevent the article ID read by the antenna 12A and the reader-writer 136B from being inadvertently registered in the registration list of the terminal device 13A due to the proximity of another cart 10B to the cart 10A.

Second Embodiment

Figure 6:
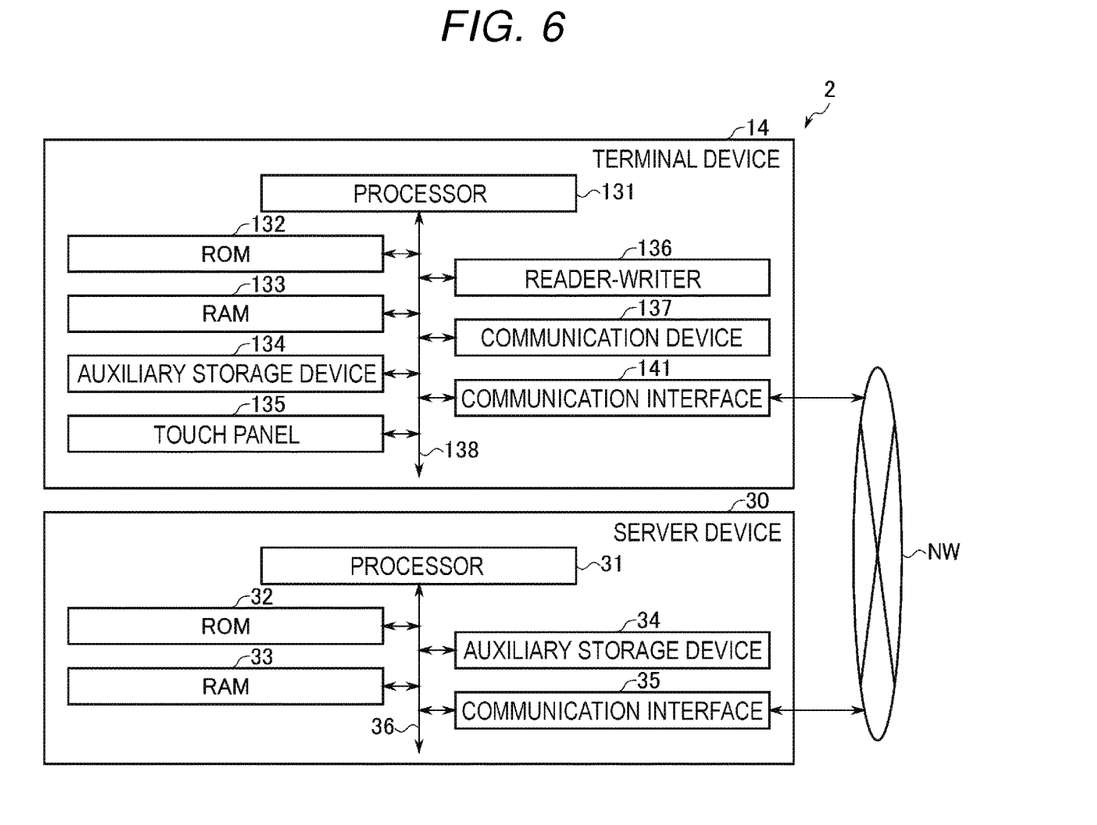
FIG. 6 is a block diagram illustrating an example of an input system according to a second embodiment and a circuit configuration of components included in the input system.

FIG. 6 is a view illustrating an example of an input system 2 according to a second embodiment and a circuit configuration of components of the input system 2.

The input system 2 includes a server device 30 in addition to the components of the input system 1 of the first embodiment. The input system 2 includes a terminal device 14 instead of the terminal device 13 of the first embodiment. In the input system 2, the registration list is stored in the server device 30. The input system 2 is an example of an article input system.

In the second embodiment, the terminal device 14 and the server device 30 are connected to a network NW. The network NW is typically a communication network including a private network such as an intranet. The network NW is a communication network that typically includes a local area network (LAN).

Further, the terminal device 14 includes a communication interface 141 in addition to the terminal device 13 of the first embodiment.

The communication interface 141 is an interface for the cart 10 to communicate via the network NW or the like.

In the second embodiment, the auxiliary storage device 134 does not need to store the registration list and the threshold value T1. In the second embodiment, the auxiliary storage device 134 stores a terminal ID. The terminal ID is identification information uniquely assigned to each terminal device 14.

The server device 30 stores and manages the registration list. As an example, the server device 30 includes a processor 31, a ROM 32, a RAM 33, an auxiliary storage device 34, and a communication interface 35. Further, a bus 36 or the like connects those units. The server device 30 of the second embodiment is an example of an article input device.

The processor 31 corresponds to a central part of a computer that performs processing such as computation and control necessary for the operation of the server device 30. The processor 31 controls each unit to realize various functions of the server device 30 based on programs such as firmware, system software, and application software stored in the ROM 32, the auxiliary storage device 34, or the like. Part or all of the program may be incorporated in the circuit of the processor 31. The processor 31 is, for example, a CPU, MPU, SoC, DSP, GPU, ASIC, PLD, or FPGA. Alternatively, the processor 31 is a combination of two or more of CPU, MPU, SoC, DSP, GPU, ASIC, PLD, and FPGA.

The ROM 32 corresponds to a main storage device of a computer having the processor 31 as a central part. The ROM 32 is a non-volatile memory used exclusively for reading data. The ROM 32 stores, for example, firmware among the above programs. The ROM 32 stores data, various setting values, and the likes used by the processor 31 for performing various processes.

The RAM 33 corresponds to a main storage device of a computer having the processor 31 as a central part. The RAM 33 is a memory used for reading and writing data. The RAM 33 is used as a so-called work area that stores data temporarily used when the processor 31 performs various processes. The RAM 33 is a volatile memory, for example.

The auxiliary storage device 34 corresponds to an auxiliary storage device of a computer having the processor 31 as a central part. The auxiliary storage device 34 is, for example, an EEPROM, an HDD, an SSD, or an eMMC. The auxiliary storage device 34 stores, for example, system software and application software among the above programs. In addition, the auxiliary storage device 34 stores data used when the processor 31 performs various processes, data generated by the process in the processor 31, various setting values, and the like.

The auxiliary storage device 34 stores a threshold value T1 and a registration list of each terminal device 14. The auxiliary storage device 34 stores the registration list in association with the terminal ID so as to know that the registration list is a registration list of which terminal device 14.

The program stored in the ROM 32 or the auxiliary storage device 34 includes a program for executing processing to be described below. As an example, the server device 30 is transferred to an administrator of the server device 30 or the like with the program is pre-stored in the ROM 32 or the auxiliary storage device 34. However, the server device 30 may be transferred to the administrator or the like with the program is not pre-stored in the ROM 32 or the auxiliary storage device 34. The server device 30 may be transferred to the administrator or the like with another program already stored in the ROM 32 or the auxiliary storage device 34. A program for executing processing to be described below may be separately transferred to the administrator or the like and then written to the ROM 32 or the auxiliary storage device 34 under the operation of the administrator or a serviceman. Transfer of the program can be realized, for example, by recording the program on a removable storage medium such as a magnetic disk, a magneto-optical disk, an optical disk, or a semiconductor memory or by downloading via the network NW or the like.

The communication interface 35 is an interface for the server device 30 to communicate via the network NW or the like.

The bus 36 includes a control bus, an address bus, a data bus, and the like and transmits signals exchanged in each part of the server device 30.

Figure 7:
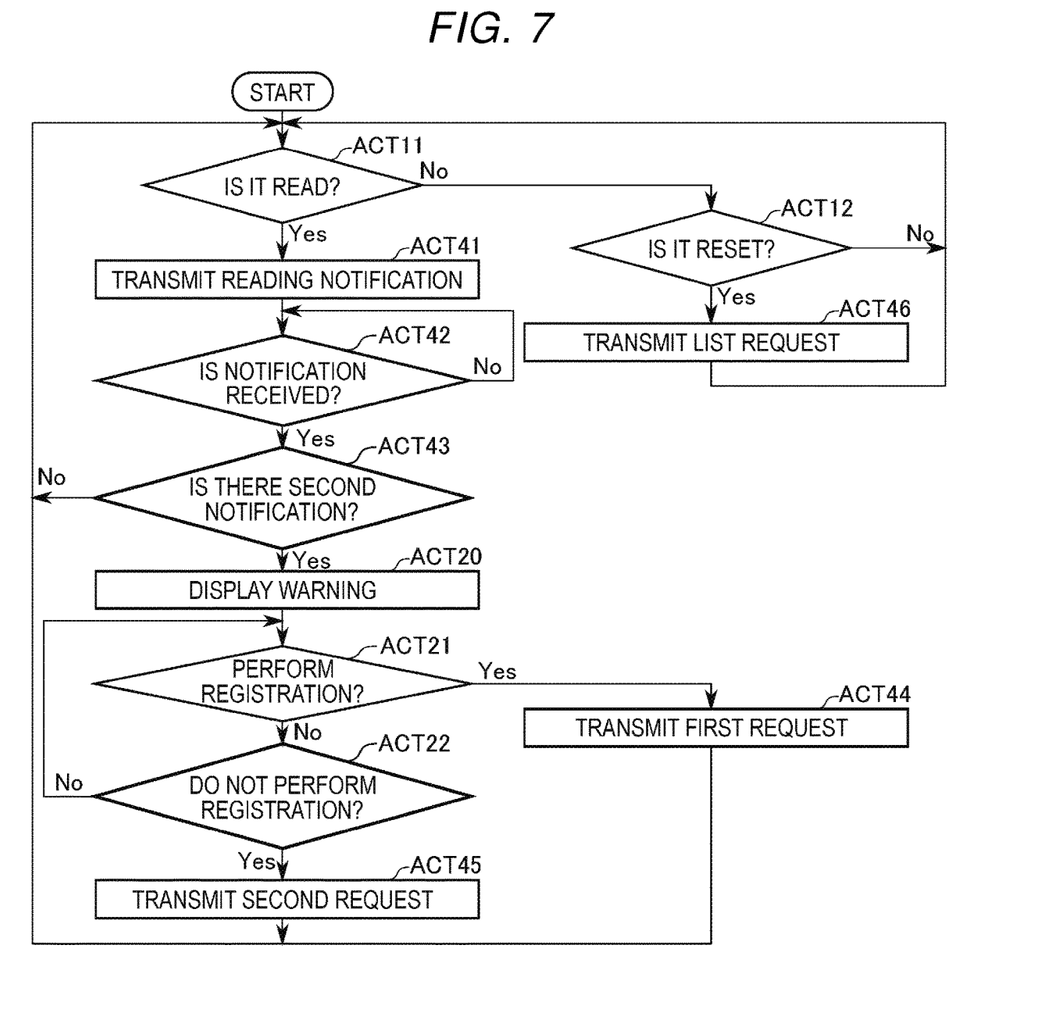
FIG. 7 is a flowchart illustrating an example of processing according to the second embodiment by a processor of a terminal device.
Figure 8:
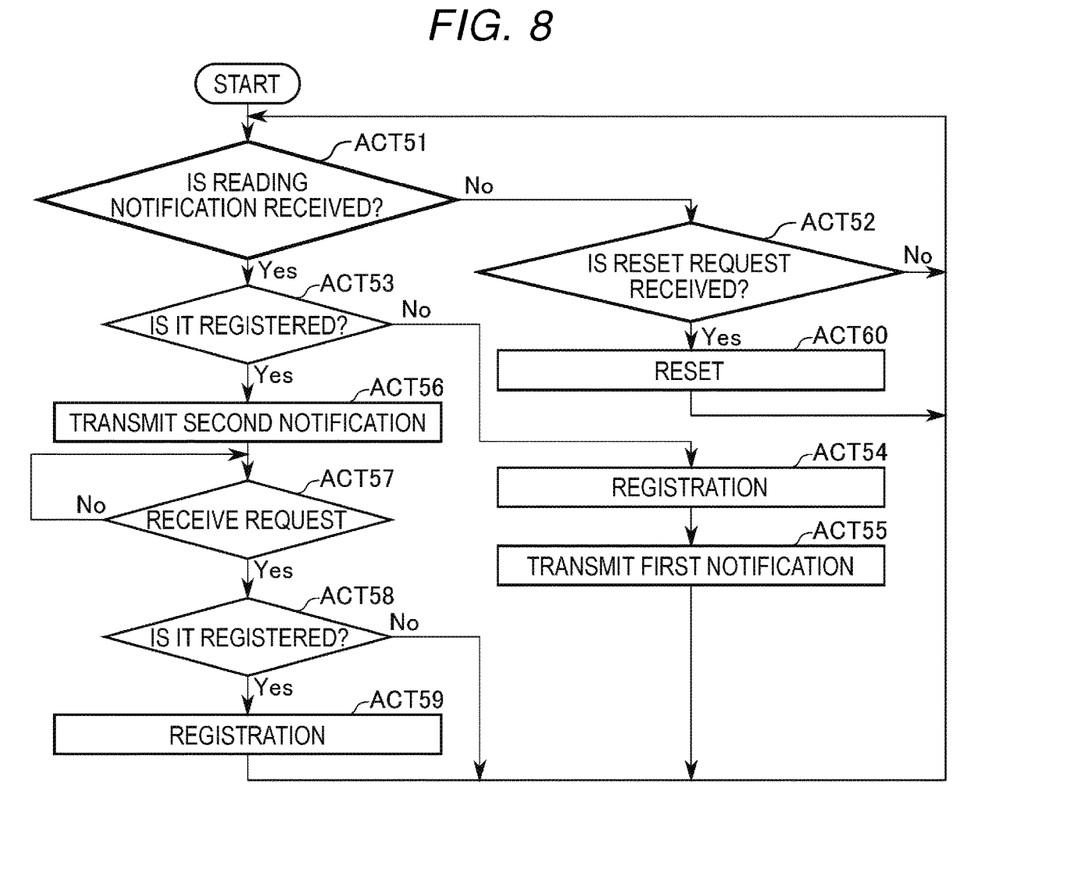
FIG. 8 is a flowchart illustrating an example of processing according to the second embodiment by a processor of a server device.

Hereinafter, the operation of the input system 1 according to the second embodiment will be described with reference to FIGS. 7 and 8. The processing in the following description of the operation is an example and various other processing that can obtain a similar result could be used as appropriate. FIG. 7 is a flowchart illustrating an example of processing by the processor 131 of the terminal device 13. The processor 131 executes this processing based on a program stored in the ROM 132 or the auxiliary storage device 134, for example. FIG. 8 is a flowchart illustrating an example of processing by the processor 31 of the server device 30. The processor 31 executes this processing based on a program stored in the ROM 32 or the auxiliary storage device 34, for example. When the processor 31 proceeds to ACT (n+1) after processing ACT n (n is a positive integer), the description as described in this way may be omitted.

When the processor 131 of the terminal device 14 determines Yes in the process of ACT 11 in FIG. 7, the process proceeds to ACT 41.

In ACT 41, the processor 131 generates a reading notification. The reading notification includes the read article ID and the terminal ID stored in the auxiliary storage device 134. The reading notification notifies the server device 30 that the article ID included in the reading notification is read by a terminal specified by the terminal ID included in the reading notification. After generating the reading notification, the processor 131 instructs the communication interface 141 to transmit the reading notification to the server device 30. In response to this instruction, the communication interface 141 transmits the reading notification to the server device 30. The transmitted reading notification is received by the communication interface 35 of the server device 30.

In ACT 51 of FIG. 8, the processor 31 of the server device 30 determines whether the reading notification is received by the communication interface 35. When the reading notification is not received, the processor 31 determines No in ACT 51 and proceeds to ACT 52.

In ACT 52, the processor 31 determines whether a reset request is received by the communication interface 35. When the reset request is not received, the processor 31 determines No in ACT 52 and returns to ACT 51. Thus, the processor 31 repeats ACT 51 and ACT 52 until the reading notification or the reset request is received. The reset request will be described below.

When the reading notification is received in the standby state of ACT 51 and ACT 52, the processor 31 determines Yes in ACT 51 and proceeds to the ACT 53.

In ACT 53, the processor 31 determines whether at least one of the registration lists other than the registration list associated with the terminal ID included in the reading notification received in ACT 51 includes the same article ID as the read article ID included in the reading notification. In other words, the registration list other than the registration list specified by the terminal ID is a registration list associated with a terminal ID other than the terminal ID. When the article ID is not included in any of the registration lists other than the registration list associated with the terminal ID included in the reading notification, the processor 31 determines No in ACT 53 and proceeds to ACT 54.

In ACT 54, the processor 31 writes the read article ID included in the reading notification in association with the current time in the registration list associated with the terminal ID included in the reading notification received in ACT 51. Thereby, the article ID is registered in the registration list.

In ACT 55, the processor 31 instructs the communication interface 35 to transmit a first notification to the terminal device 14. The first notification notifies the terminal device 14 that the read article ID is registered in the registration list. In response to the transmission instruction, the communication interface 35 transmits the first notification to the terminal device 14. The transmitted first notification is received by the communication interface 141 of the terminal device 14. The processor 31 returns to ACT 51 after the processing of ACT 55.

However, when at least one of the registration lists other than the registration list associated with the terminal ID included in the reading notification includes the article ID, the processor 31 determines Yes in ACT 53 and proceeds to ACT 56.

In ACT 56, the processor 31 instructs the communication interface 35 to send a second notification to the terminal device 14. The first notification notifies the terminal device 14 that the read article ID is already registered in the registration list associated with the terminal ID of the other terminal device 14. In response to the transmission instruction, the communication interface 35 transmits the second notification to the terminal device 14. The transmitted second notification is received by the communication interface 141 of the terminal device 14.

In ACT 42 of FIG. 7, the processor 131 of the terminal device 14 waits for the communication interface 141 to receive the first notification or the second notification. When the first notification or the second notification is received, the processor 131 determines Yes in ACT 42 and proceeds to ACT 43.

In ACT 43, the processor 131 determines whether the notification received in ACT 42 is the second notification. When the notification received in ACT 42 is not the second notification, the processor 131 determines No in ACT 43 and returns to ACT 11. On the other hand, when the notification received in ACT 42 is the second notification, the processor 131 determines Yes in ACT 43 and proceeds to ACT 10.

In the second embodiment, when the processor 131 determines Yes in ACT 21, the processor 131 proceeds to ACT 44.

In ACT 44, the processor 131 instructs the communication interface 141 to transmit the first request to the server device 30. The first request requests the server device 30 to register the read article ID in the registration list. In response to the transmission instruction, the communication interface 141 transmits the first request to the server device 30. The transmitted first request is received by the communication interface 35 of the server device 30. The processor 131 returns to ACT 11 after processing of ACT 44.

In the second embodiment, when the processor 131 determines Yes in ACT 22, the processor 131 proceeds to ACT 45.

In ACT 45, the processor 131 instructs the communication interface 141 to transmit the second request to the server device 30. The second request requests the server device 30 not to register the read article ID in the registration list. In response to the transmission instruction, the communication interface 141 transmits the second request to the server device 30. The transmitted second request is received by the communication interface 35 of the server device 30. The processor 131 returns to ACT 11 after processing of ACT 45.

In ACT 57 of FIG. 8, the processor 31 of the server device 30 waits for the communication interface 35 to receive the first request or the second request. When the first request or the second request is received, the processor 31 determines Yes in ACT 57 and proceeds to ACT 58.

In ACT 58, the processor 31 determines whether to register the read article ID included in the reading notification received in ACT 51 in the registration list. That is, the processor 31 determines whether the request received in ACT 57 is the first request. When the request received in ACT 57 is the second request, the processor 31 determines No in ACT 58 and returns to ACT 51. On the other hand, when the request received in ACT 57 is the first request, the processor 31 determines Yes at ACT 58 and proceeds to ACT 59.

In ACT 59, the processor 31 writes the read article ID included in the reading notification in association with the current time in the registration list associated with the terminal ID included in the reading notification received in ACT 51. Thereby, the article ID is registered in the registration list. The processor 31 returns to ACT 51 after processing of ACT 59.

In the second embodiment, when the processor 131 of the terminal device 14 determines Yes in the processing of ACT 12 in FIG. 7, the process proceeds to ACT 46.

In ACT 46, the processor 131 generates a reset request. The reset request includes the terminal ID stored in the auxiliary storage device 134. The reset request requests the server device 30 to reset the registration list associated with the terminal ID. After generating the reset request, the processor 131 instructs the communication interface 141 to transmit the reset request to the server device 30. In response to the transmission instruction, the communication interface 141 transmits the reset request to the server device 30. The transmitted reset request is received by the communication interface 35 of the server device 30. The processor 131 returns to ACT 11 after processing of ACT 46.

When the reset request is received in the standby state of the ACT 51 and the ACT 52 in FIG. 8, the processor 31 of the server device 30 determines Yes in ACT 52 and proceeds to ACT 60.

In ACT 60, the processor 31 resets the registration list associated with the terminal ID included in the reset request received in ACT 52. That is, the processor 31 deletes all article IDs from the registration list so that the article ID is not included in the registration list. The processor 31 returns to ACT 51 after processing of ACT 60.

According to the input system 2 of the second embodiment, the server device 30 can obtain the similar effects as that of the terminal device 13 of the first embodiment.

The embodiments described above can be modified as follows.

In the first embodiment, the processor 131 of the terminal device 13A acquires the registration list directly from the terminal device 13B and then determines whether the read article ID is registered in the registration list. Alternatively, the processor 131 may transmit the read article ID to the terminal device 13B via the communication device 137A. The processor 131 of the terminal device 13B that receives the read article ID then determines whether the read article ID is registered in the registration list stored in the auxiliary storage device 134B. Then, the processor 131 of the terminal device 13B transmits the determination result to the terminal device 13A via the communication device 137B. The processor 131 of the terminal device 13B that receives the determination result then knows whether the read article ID is already registered in the registration list of the terminal device 13B based on the determination result.

In the first embodiment, the processor 131 of the terminal device 13 registers the article ID once in the registration list, and then leaves the registration of the article ID as it is or deletes the article ID from the registration list. However, in other examples, the processor 131 may register an article ID in the registration list only after first determining whether to register the article ID. That is, as an example, the processor 131 proceeds to ACT 14 when it is determined Yes in ACT 11 of FIG. 3. The processor 131 performs the process of ACT 13 when it is determined No in ACT 15, when it is determined No in ACT 18, and when it is determined Yes in ACT 21. Then, the processor 131 returns to ACT 11 after the processing of ACT 13. Further, when it is determined Yes in ACT 22, the processor 131 returns to ACT 11.

The communication device 137 may communicate with the other communication devices 137 via a wireless LAN base station or the like. In this case, in ACT 14, the terminal device 13A is connected to, for example, all of the terminal devices 13B included in the input system 1.

In the first embodiment, the registration list may be stored in a storage device external to the terminal device 13. For example, the storage device is included in the server device. The terminal device 13 operates in the same manner as in the first embodiment in cooperation with the server device. In this case, the terminal device 13 and the server device communicate with each other via the network NW or the like.

Similar to the terminal device 13 of the first embodiment, the processor 31 of the server device 30 may register the article ID once in the registration list, and then perform the process of leaving the registration of the article ID as it is or deleting the article ID from the list. That is, when it is determined Yes in ACT 51 of FIG. 8, the processor 31 proceeds to ACT 54. Then, the processor 31 proceeds to ACT 53 after processing of ACT 54. When it is determined No in ACT 53, the processor 31 proceeds to ACT 55. When it is determined Yes in ACT 58, the processor 31 returns to ACT 51. Further, when it is determined No in ACT 58, the processor 31 deletes the article ID registered in the registration list registered in ACT 54 from the registration list.

In the first embodiment, when there are a plurality of terminal devices 13B within a predetermined range, the terminal device 13A is connected simultaneously with all of the terminal devices 13B. However, in other examples, when there are a plurality of terminal devices 13B within a predetermined range, the terminal device 13 may instead be connected to the terminal devices 13B one by one to obtain the registration lists from each in turn or serially.

In some examples, the input system 1 or the input system 2 may be on or integrated with a container used for carrying articles 20 such as a hand-carried shopping basket instead of a cart 10. In such a container, the terminal device 13 or the terminal device 14 and the antenna 12 are installed. The container is another example of a carrier for carrying the article 20.

The processor 131 or the processor 31 may realize part or all of the processing realized by a software program in the above-described example embodiments instead by a circuit hardware configuration.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An article registration terminal device on a first cart for storing articles, comprising:
   a wireless tag reader configured to read identification information of an article from a wireless tag attached thereto;
   a display configured to display information to an operator of the first cart;
   a memory that stores a first list in which identification information of one or more articles stored in the first cart is to be registered;
   a communication interface configured to wirelessly communicate with another article registration terminal device on a second cart when the wireless tag, the article registration terminal device, and said another article registration terminal device are all in communication range with each other; and
   a processor configured to:
      acquire identification information of an article from a wireless tag via the wireless tag reader;
      acquire, from said another article registration terminal device via the communication interface, a second list of identification information of one or more articles registered therein by said another article registration terminal device;
      search the second list for the acquired identification information;
      when the acquired identification information is not on the second list, register the acquired identification information onto the first list; and
      when the acquired identification information is on the second list,
         generate a screen for the display in which the acquired identification information on the first list is displayed as selectable to be registered onto the first list, and
         when a selection is received to register the acquired identification information onto the first list, register the acquired identification information onto the first list.

2. The article registration terminal device according to claim 1, wherein the processor is further configured to determine to not register the acquired identification information onto the first list when the acquired identification information is on the second list and an elapsed time since the acquired identification information was added to the second list exceeds a predetermined time.

3. The article registration terminal device according to claim 1, wherein the display includes a touch panel configured to receive operator input, and the processor is further configured to register the acquired identification information onto the first list according to the operator input made on the screen.

4. The article registration terminal device according to claim 1, wherein the screen includes: a first button that is selectable by the operator to accept the registration of the acquired identification information on the first list, and a second button that is selectable by the operator to not accept the registration of the acquired identification information on the first list.

5. An article registration system, comprising:
a plurality of article registration terminal devices each disposed on a cart for storing articles, each article registration terminal device including:
    a wireless tag reader configured to read identification information of an article from a wireless tag attached thereto;
    a display configured to display information to an operator of the cart;
    a memory that stores a list in which identification information of one or more articles stored in the cart is to be registered;
    a communication interface configured to wirelessly communicate with another article registration terminal device on another cart when the wireless tab, said each article registration terminal device, and said another article registration terminal device are all in communication range with each other; and
    a processor configured to:
        acquire identification information of an article from a wireless tag via the wireless tag reader;
        acquire, from said another article registration terminal device via the communication interface, another list of identification information of one or more articles registered therein by said another article registration terminal device;
        search said another list for the acquired identification information;
        when the acquired identification information is not on said another list, register the acquired identification information onto the list stored in the memory; and
        when the acquired identification information is on said another list,
            generate a screen for the display in which the acquired identification information on the list stored in the memory is displayed as selectable to be registered onto the list stored in the memory, and
            when a selection is received to register the acquired identification information onto the list, register the acquired identification information onto the list.

6. The article registration system according to claim 5, wherein
the display includes a touch panel configured to receive a user input, and
the processor is further configured to register the acquired identification information onto the list stored in the memory according to the user input made on the screen.

7. The article registration system according to claim 5, wherein the screen includes a first button that is selectable by the operator to accept the registration of the acquired identification information on the list stored in the memory, and a second button that is selectable by the operator to not accept the registration of the acquired identification information on the list stored in the memory.

8. The article registration system according to claim 5, wherein the processor is further configured to determine to not register the acquired identification information onto the list stored in the memory when the acquired identification information is on said another list and an elapsed time since the acquired identification information was added to said another list exceeds a predetermined time.

* * * * *

UNITED STATES PATENT AND TRADEMARK OFFICE
CERTIFICATE OF CORRECTION

PATENT NO. : 11,393,012 B2
APPLICATION NO. : 16/748129
DATED : July 19, 2022
INVENTOR(S) : Seiya Kishimoto et al.

It is certified that error appears in the above-identified patent and that said Letters Patent is hereby corrected as shown below:

In the Claims

In Column 15, Claim 5, Line 28, please delete "tab" and replace with "tag".

Signed and Sealed this
Twentieth Day of December, 2022

Katherine Kelly Vidal
*Director of the United States Patent and Trademark Office*